(12) United States Patent
Chae et al.

(10) Patent No.: US 9,806,865 B2
(45) Date of Patent: Oct. 31, 2017

(54) METHOD AND APPARATUS FOR TRANSMITTING SIGNAL FROM DEVICE-TO-DEVICE TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Hakseong Kim, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 100 days.

(21) Appl. No.: 14/905,267

(22) PCT Filed: Aug. 5, 2014

(86) PCT No.: PCT/KR2014/007222
§ 371 (c)(1),
(2) Date: Jan. 14, 2016

(87) PCT Pub. No.: WO2015/020398
PCT Pub. Date: Feb. 12, 2015

(65) Prior Publication Data
US 2016/0156441 A1    Jun. 2, 2016

Related U.S. Application Data

(60) Provisional application No. 61/862,510, filed on Aug. 5, 2013, provisional application No. 61/969,079, filed
(Continued)

(51) Int. Cl.
*H04L 5/00* (2006.01)
*H04J 11/00* (2006.01)
(Continued)

(52) U.S. Cl.
CPC .......... *H04L 5/0048* (2013.01); *H04J 11/003* (2013.01); *H04J 11/0069* (2013.01);
(Continued)

(58) Field of Classification Search
CPC .. H04J 11/003; H04J 11/0069; H04J 13/0003; H04L 5/0048; H04L 5/0051;
(Continued)

(56) References Cited

U.S. PATENT DOCUMENTS

2005/0232171 A1* 10/2005 Hasegawa ................ H04B 3/02
370/276
2014/0146772 A1* 5/2014 Kwak .................. H04L 5/0048
370/329
(Continued)

FOREIGN PATENT DOCUMENTS

CN   101931456   12/2010
CN   102859925   1/2013
(Continued)

OTHER PUBLICATIONS

NEC Group, "Uplink Reference Signal Enhancement for Low Cost MTC", R1-132335, 3GPP TSG RAN WG1 Meeting #73, May 2013, 5 pages.
(Continued)

*Primary Examiner* — Stephen J Clawson
(74) *Attorney, Agent, or Firm* — Lee, Hong, Degerman, Kang & Waimey PC

(57) ABSTRACT

One embodiment of the present invention relates to a method for transmitting a signal from a device-to-device (D2D) terminal in a wireless communication system, which is a signal transmission method comprising: generating a reference signal sequence; mapping the reference signal sequence on specific symbols; and transmitting a signal comprising the reference signal sequence, wherein the spe-
(Continued)

(a)

(b)

(c)

cific symbols are shifted n and m symbols, respectively, away from the fourth symbol of each slot toward a time axis.

13 Claims, 15 Drawing Sheets

Related U.S. Application Data on Mar. 21, 2014, provisional application No. 61/994,107, filed on May 15, 2014.

(51) Int. Cl.
   *H04J 13/00*     (2011.01)
   *H04W 72/04*     (2009.01)
   *H04W 28/06*     (2009.01)
   *H04W 92/18*     (2009.01)
   *H04W 88/02*     (2009.01)

(52) U.S. Cl.
   CPC ........ *H04J 13/0003* (2013.01); *H04L 5/0051* (2013.01); *H04W 72/0446* (2013.01); *H04W 28/06* (2013.01); *H04W 88/02* (2013.01); *H04W 92/18* (2013.01)

(58) Field of Classification Search
   CPC ............. H04W 28/06; H04W 72/0446; H04W 88/02; H04W 92/18
   USPC ........................................................ 370/336
   See application file for complete search history.

(56) References Cited

U.S. PATENT DOCUMENTS

| | | | | |
|---|---|---|---|---|
| 2015/0208453 | A1* | 7/2015 | Yamazaki | H04W 8/005 370/329 |
| 2016/0007406 | A1* | 1/2016 | Yi | H04W 52/0206 370/252 |
| 2016/0127098 | A1* | 5/2016 | Ng | H04L 5/0048 370/329 |
| 2016/0149660 | A1* | 5/2016 | Seo | H04W 56/0015 370/336 |
| 2016/0165616 | A1* | 6/2016 | Ohwatari | H04W 72/082 370/329 |
| 2017/0078061 | A1* | 3/2017 | Sawahashi | H04L 5/0044 |

FOREIGN PATENT DOCUMENTS

| | | |
|---|---|---|
| JP | 2013529416 | 7/2013 |
| KR | 10-2011-0089311 | 8/2011 |
| KR | 10-2011-0117032 | 10/2011 |
| WO | 2012/046173 | 4/2012 |
| WO | 2013/066126 | 5/2013 |
| WO | 2013/077684 | 5/2013 |
| WO | 2014017498 | 7/2016 |

OTHER PUBLICATIONS

PCT International Application No. PCT/KR2014/007222, Written Opinion of the International Searching Authority dated Nov. 20, 2014, 15 pages.
State Intellectual Property Office of the People's Republic of China Application Serial No. 201480044675.4, Office Action dated Jul. 3, 2017, 14 pages.

* cited by examiner

FIG. 5
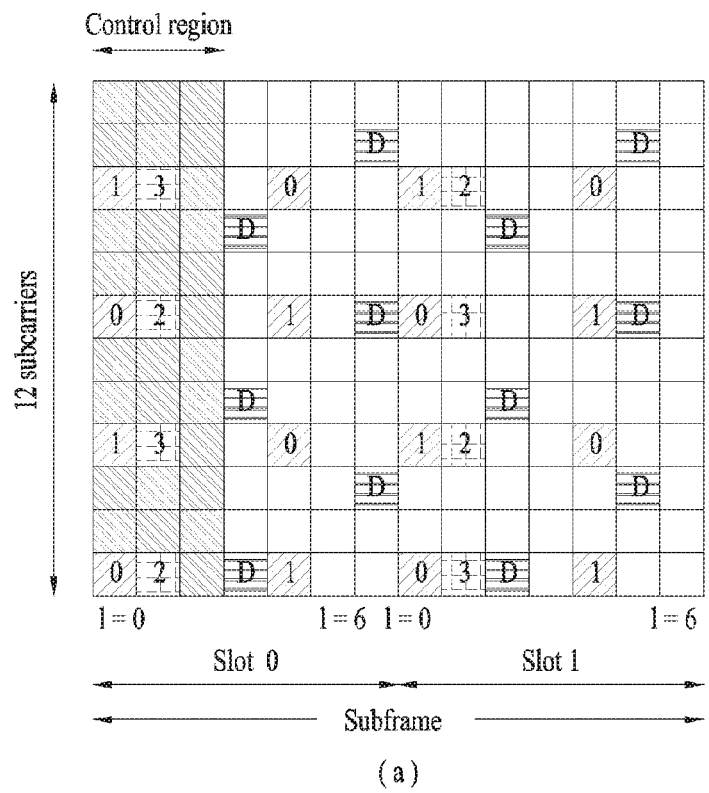
(a)
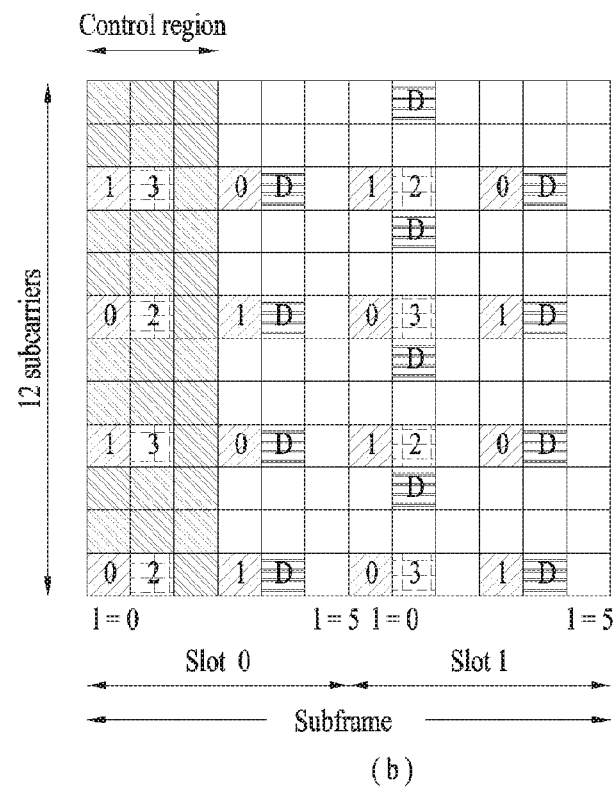
(b)

FIG. 7
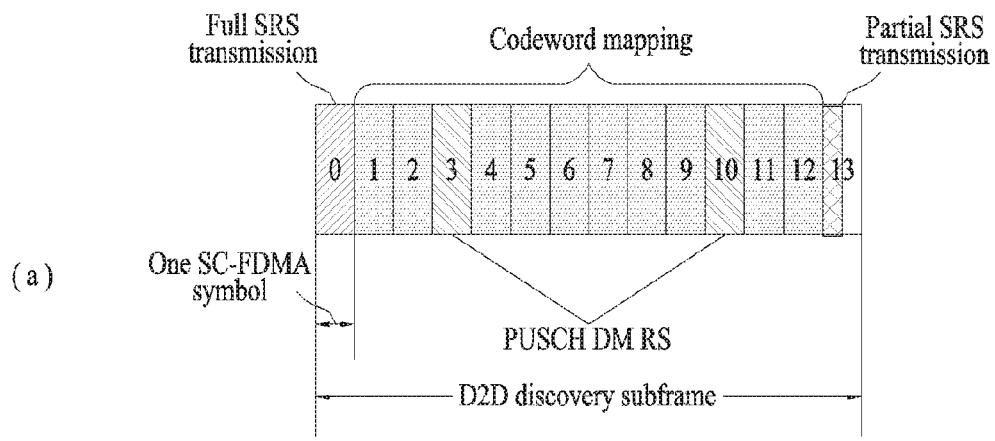
(a)
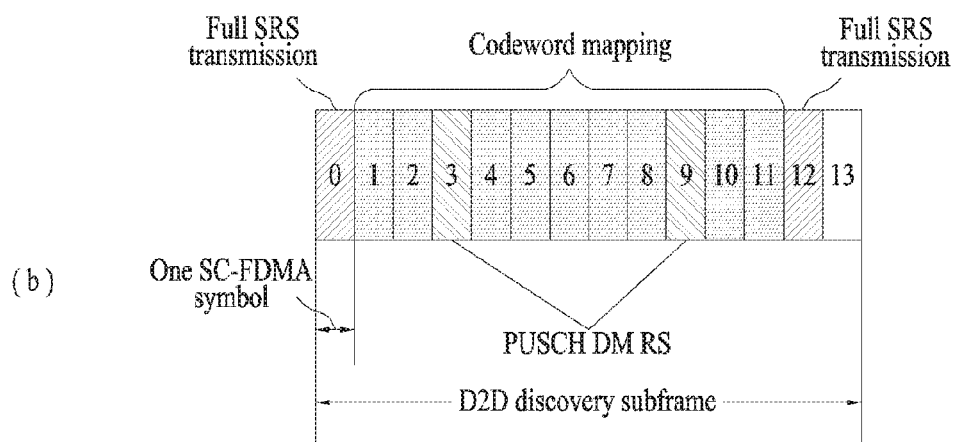
(b)
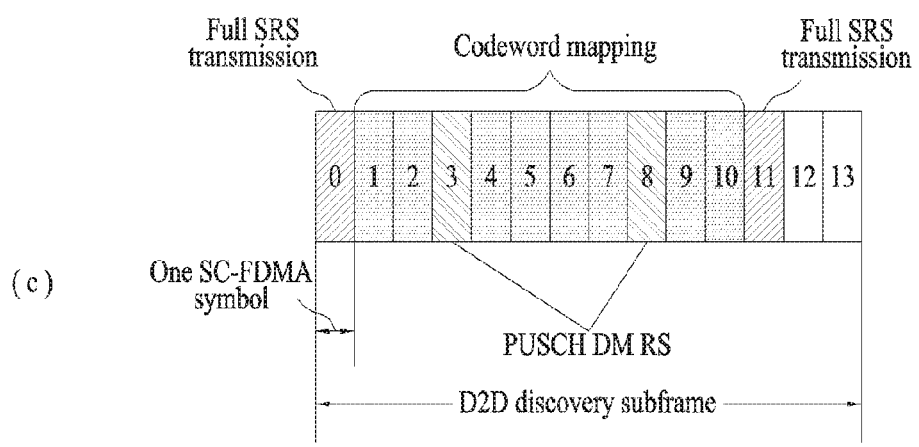
(c)

FIG. 8
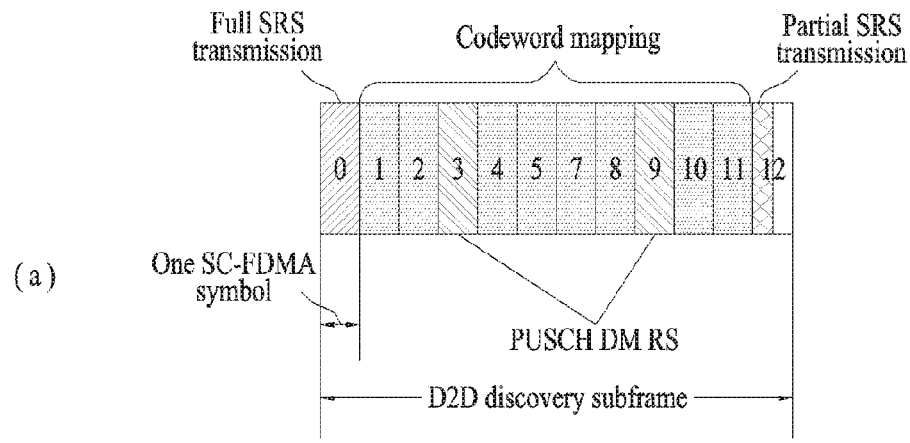
(a)
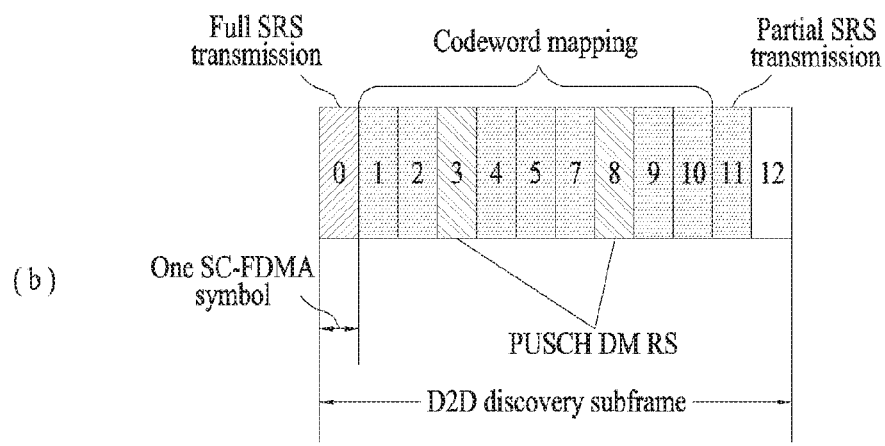
(b)
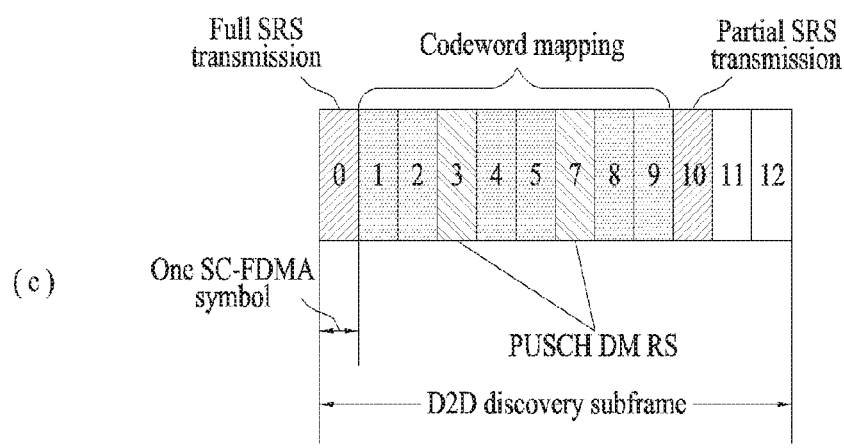
(c)

FIG. 13
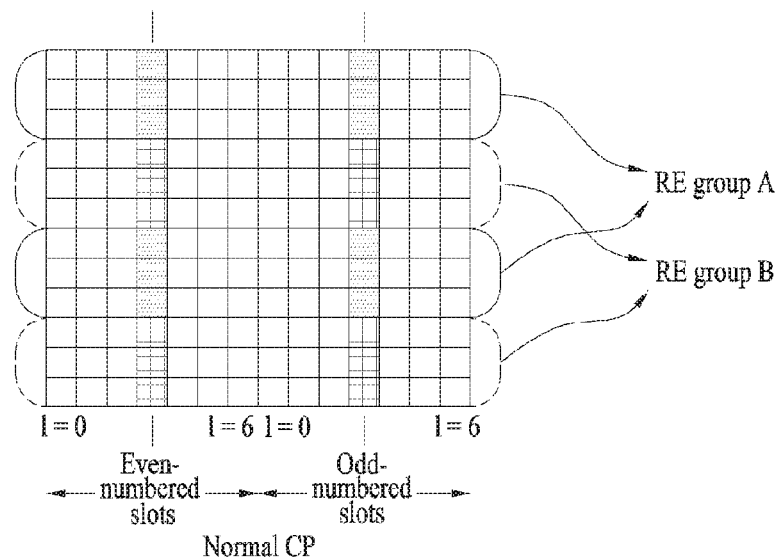
FIG. 14
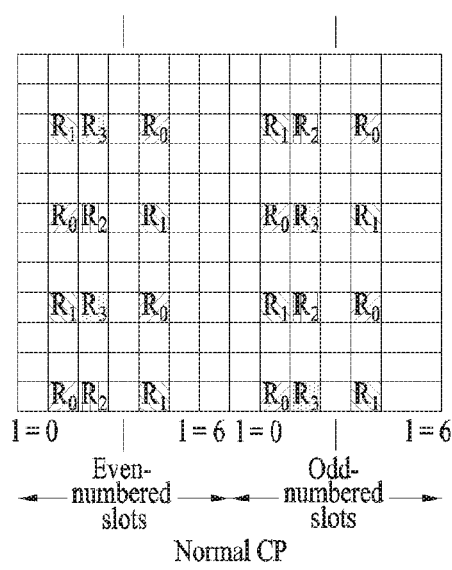
(a)
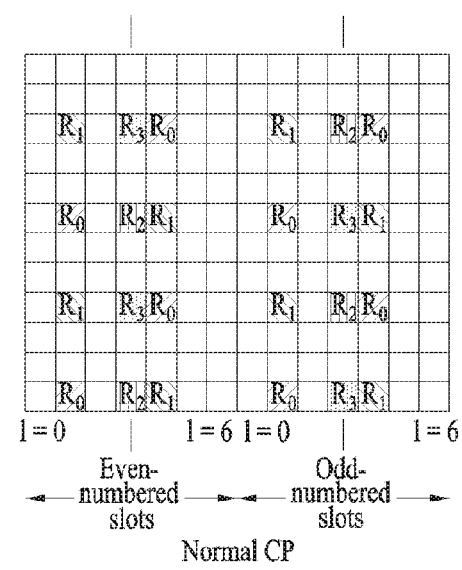
(b)

METHOD AND APPARATUS FOR TRANSMITTING SIGNAL FROM DEVICE-TO-DEVICE TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2014/007222, filed on Aug. 5, 2014, which claims the benefit of U.S. Provisional Application No. 61/862,510, filed on Aug. 5, 2013, 61/969,079, filed on Mar. 21, 2014, and 61/994,107, filed on May 15, 2014 the contents of which are all hereby incorporated by reference herein in their entirety.

TECHNICAL FIELD

Following description relates to a wireless communication, and more particularly, to a method of transmitting and receiving reference signal in device-to-device communication and an apparatus therefor.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

DISCLOSURE

Technical Problem

An object of the present invention is to provide a method for transmitting a signal comprising a reference signal (RS) in Device-to-Device (D2D) communication.

Technical tasks obtainable from the present invention are non-limited the above-mentioned technical task. And, other unmentioned technical tasks can be clearly understood from the following description by those having ordinary skill in the technical field to which the present invention pertains.

Technical Solution

The object of the present invention can be achieved by providing a method for transmitting a signal by a Device-to-Device (D2D) user equipment (UE) in a wireless communication system including: generating a reference signal (RS) sequence; mapping the RS sequence to predetermined symbols; and transmitting a signal comprising the RS sequence, wherein the predetermined symbols are shifted by 'n' and 'm' symbols respectively on the basis of a fourth symbol of each slot on a time axis.

In accordance with another aspect of the present invention, a Device-to-Device (D2D) user equipment (UE) for use in a wireless communication system includes: a reception (Rx) module; and a processor. The processor generates a reference signal (RS) sequence, maps the RS sequence to predetermined symbols, and transmits a signal comprising the RS sequence. The predetermined symbols are shifted by 'n' and 'm' symbols respectively on the basis of a fourth symbol of each slot on a time axis.

The first and second technical aspects may include all or some of the following items.

If the signal is transmitted through resource blocks (RBs) of more than 3 resource blocks (RBs), each of 'n' and 'm' may be set to zero (0).

If the signal is transmitted through resource blocks (RBs) of less than 3 resource blocks (RBs), each of 'n' and 'm' may be selected in an integer set $\{-k, \ldots, 0, \ldots, k\}$.

A value of 'k' may be determined in consideration of at least one of a cell radius to which the D2D UE belongs, a number of UEs capable of participating in D2D communication, and a number of UEs connected to a cell.

A value of 'k' may be signaled to the UE via higher layer signaling.

A value of 'm' may be determined according to a size of a guard period (GP).

If the size of the GP is larger than 1 symbol, an absolute value of the value 'm' may be equal to or higher than 1.

A number of symbols interposed between the predetermined symbol shifted by m symbols and a first symbol of the guard period (GP) may be a constant value, irrespective of the size of the GP.

A sounding reference signal (SRS) may be transmitted to a symbol located just before the guard period (GP).

If the size of the guard period (GP) is smaller than 1 symbol, an abbreviation format of the sounding reference signal (SRS) may be used.

If UE mobility is higher than a predetermined value, a sounding reference signal (SRS) may be transmitted on a first symbol of a resource block including the predetermined symbols.

If slot hopping is configured for the UE, the UE may assume that a sounding reference signal (SRS) is transmitted in at least one symbol contained in the resource block (RB) including the predetermined symbols.

Advantageous Effects

As is apparent from the above description, the embodiments of the present invention can reduce the number of interference phenomena encountered in D2D reference signal transmission, and can guarantee many more reference signals (RSs) even when the resource needed for D2D signal transmission is small in size.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for explaining a reference signal.

FIGS. 6 to 13 are diagrams illustrating a reference signal (RS) according to a first embodiment of the present invention.

FIGS. 14 to 16 are diagrams illustrating a reference signal (RS) according to a second embodiment of the present invention.

BEST MODE

Figure 1:
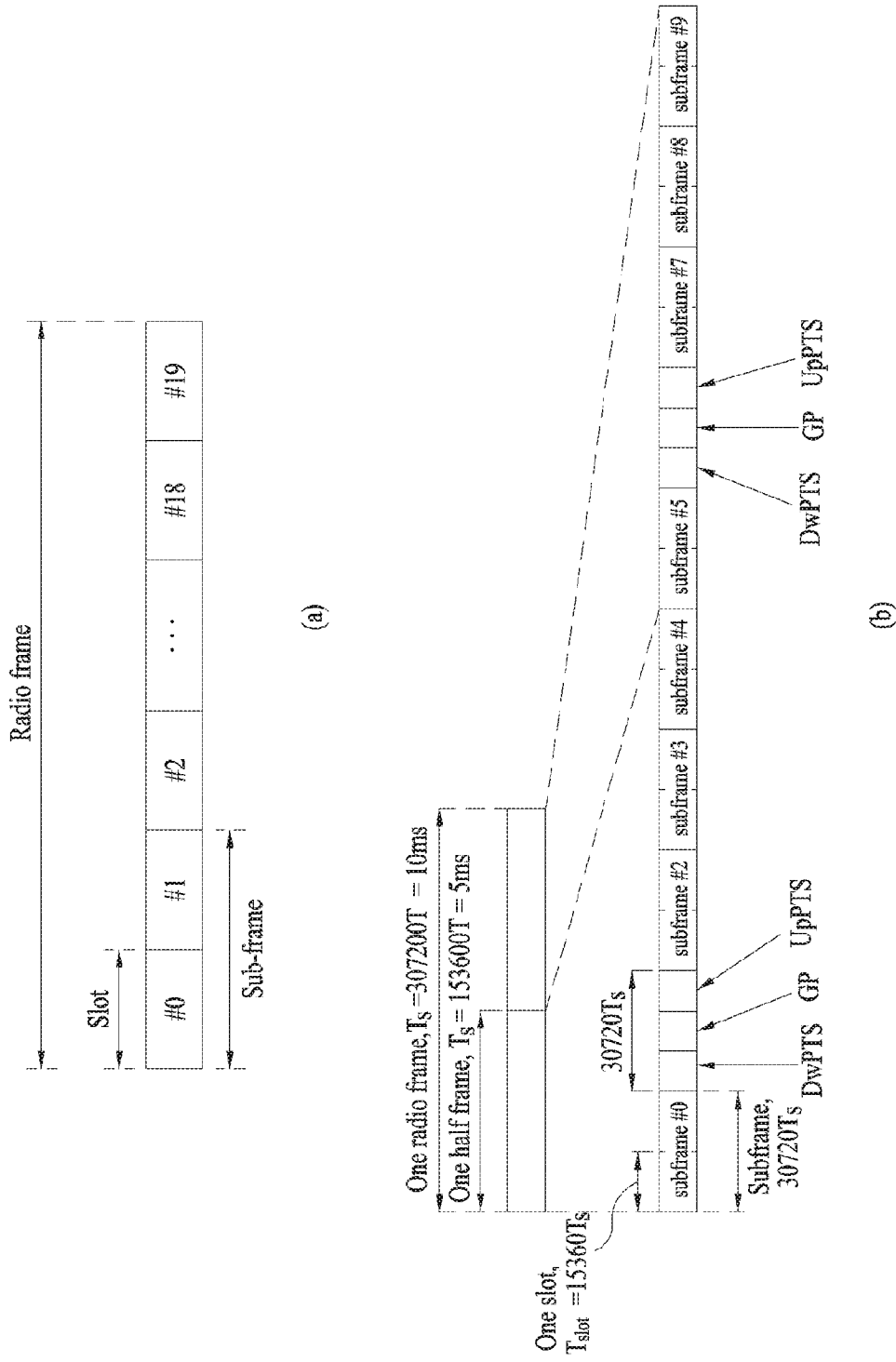
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
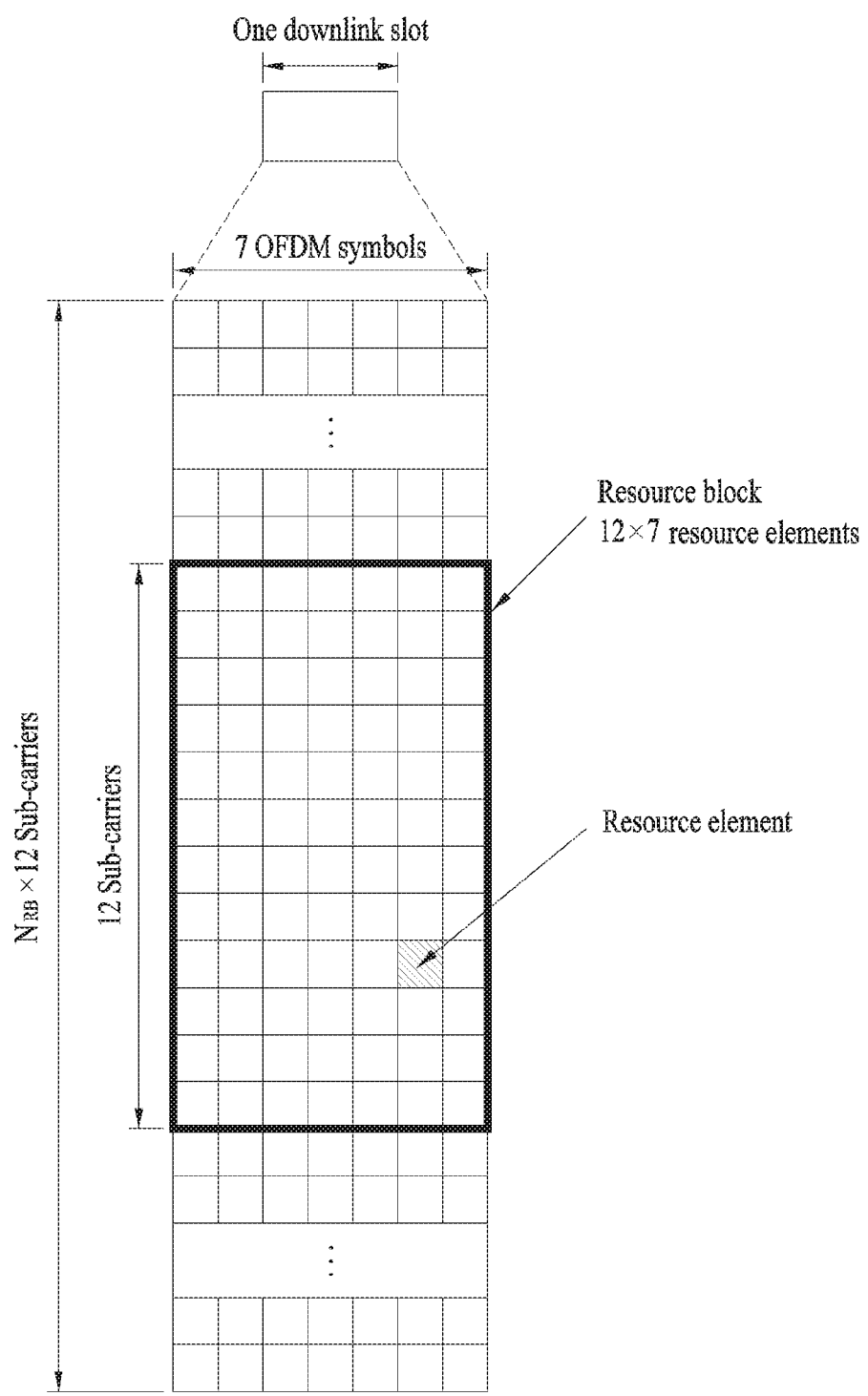
FIG. 2 is a diagram for a resource grid in downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
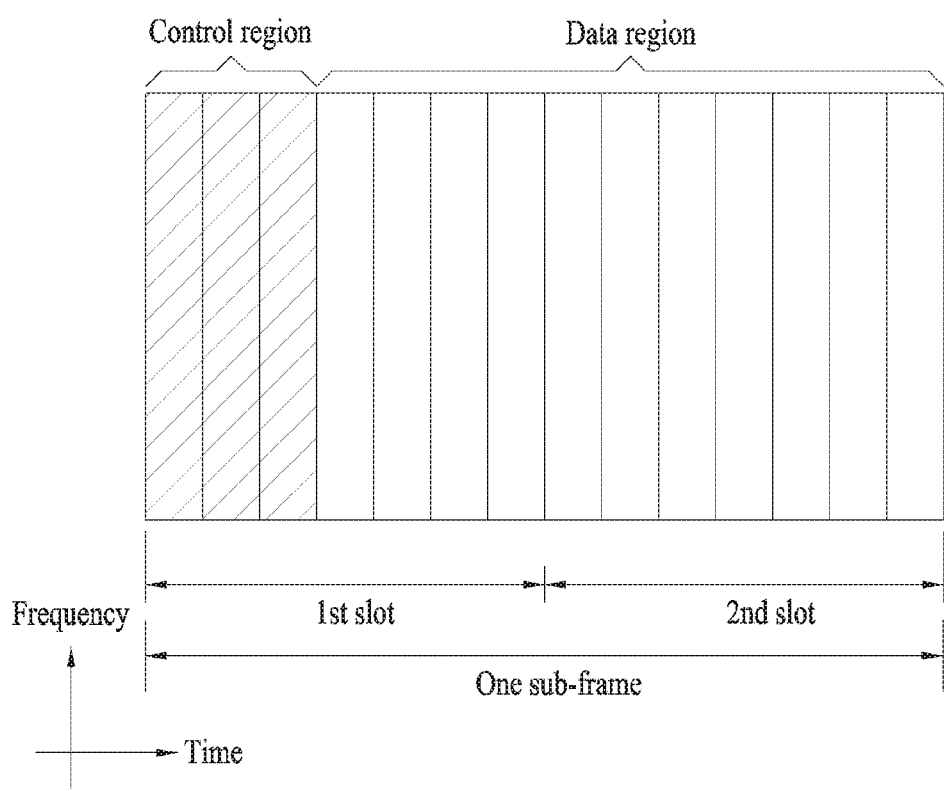
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
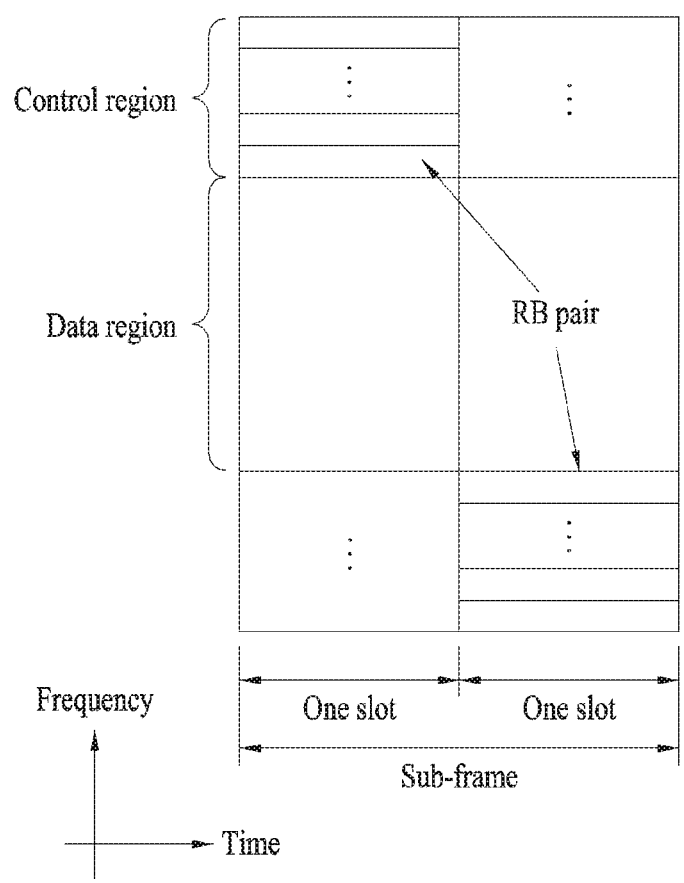
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(*a*)) and 12 OFDM symbols in time in the case of the extended CP (see FIG. 5(*b*)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

The reference signal (RS) for use in D2D signal Tx/Rx communication according to the embodiments will hereinafter be described on the basis of the above-mentioned description.

Embodiment 1

The first embodiment relates to the reference signal (RS) for use in the case in which D2D communication uses Single Carrier Frequency Division Multiplexing (SC FDM).

D2D UE may generate a reference signal (RS) sequence, may map the generated RS sequence to a predetermined (OFDM) symbol, and may transmit a signal comprising the RS. In this case, the predetermined symbols mapped to the RS may be shifted from the fourth symbol of each slot (i.e., a first slot and a second slot) by n and m symbols on a time axis, where 'n' or 'm' may be selected from among the set of integers $\{-k, \ldots, 0, \ldots, k\}$ and may have the same or different values according to respective slots. The RS sequence may be an RS sequence for use in demodulation reference signal (DMRS) generation for transmitting a PUSCH defined in the legacy LTE/LTE-A system. If RSs of all D2D UEs are simultaneously transmitted at the same position, there is a high possibility that the "near far problem" caused by power difference occurs, such that the position of time resources (and/or frequency resources) mapped to the RSs can be diversified. In more detail, the uplink reference signal (UL RS) for use in the legacy LTE/LTE-A system has a Code Division Multiplexing (CDM) structure in which the cyclic shift (CS) or a base sequence is used in different ways at the same symbol position so as to identify each UE. The CDM structure in which proper Tx power control is unnecessary may be vulnerable to the "'near far problem'". Therefore, as described above, the position of a symbol through which the D2D RS is transmitted is diversified to reduce the "near far problem".

If the D2D RS is transmitted through a small-sized RB of 3RB or higher, and if each of 'n' and 'm' is set to zero (0) and the D2D RS is transmitted through 3 RBs or less, 'n' and 'm' may be selected from among the set of integers $\{-k, \ldots, 0, \ldots, k\}$, where k may have the same or different values according to respective slots. In other words, only when the D2D signal (e.g., the discovery signal) is transmitted through the smaller number of RBs than 3 RBs, the time-axis shift can be used. When PUSCH DMRS of the legacy LTE/LTE-A system is transmitted through RBs of less than 3 RBs, a sequence having the length 12 or 24 instead of the Zadoff-Chu sequence may be used. The length-12 or length-24 sequence may be selected from among 30 sequences. If 30 sequences are used in D2D discovery, the number of RSs may be less than the number of UEs. Therefore, the RS symbol shift is applied to the case of using RBs of less than 3 RBs, such that the problem encountered by the insufficient number of RSs can be addressed.

The above method in which shifting is applied only to the case in which the D2D signal is transmitted through the smaller number of RBs than 3 RBs, and the other method in which shifting is applied without any restrictions can increase the number of RS candidates for each UE receiving the D2D signal in so far as additional signaling related to shifting is not present. For example, 'k' is set to '−1', i.e., the symbol shift value is selected from among {−1, 0, 1}. If different k values are assigned to respective slots, a maximum of 9 different RS symbol positions may be generated. However, many RS candidates may cause unexpected load to the UE, such that the RS candidates may be determined in consideration of at least one of the cell radius, the number of UEs participating in D2D communication, and the number of UEs connected to the cell. In addition, the determined 'k' value (for each slot) may also be signaled to the UE through higher layer or physical layer signaling. Alternatively, the above information may be transferred from the Tx UE to the Rx UE through a control channel between D2D devices.

In the above-mentioned description, the symbol through which the legacy PUSCH DMRS is transmitted may be established in a manner that the D2D UE cannot be used. In other words, n or m may be selected from among the set of integers {−k, . . . , −1, 1, . . . , k}.

Figure 6:
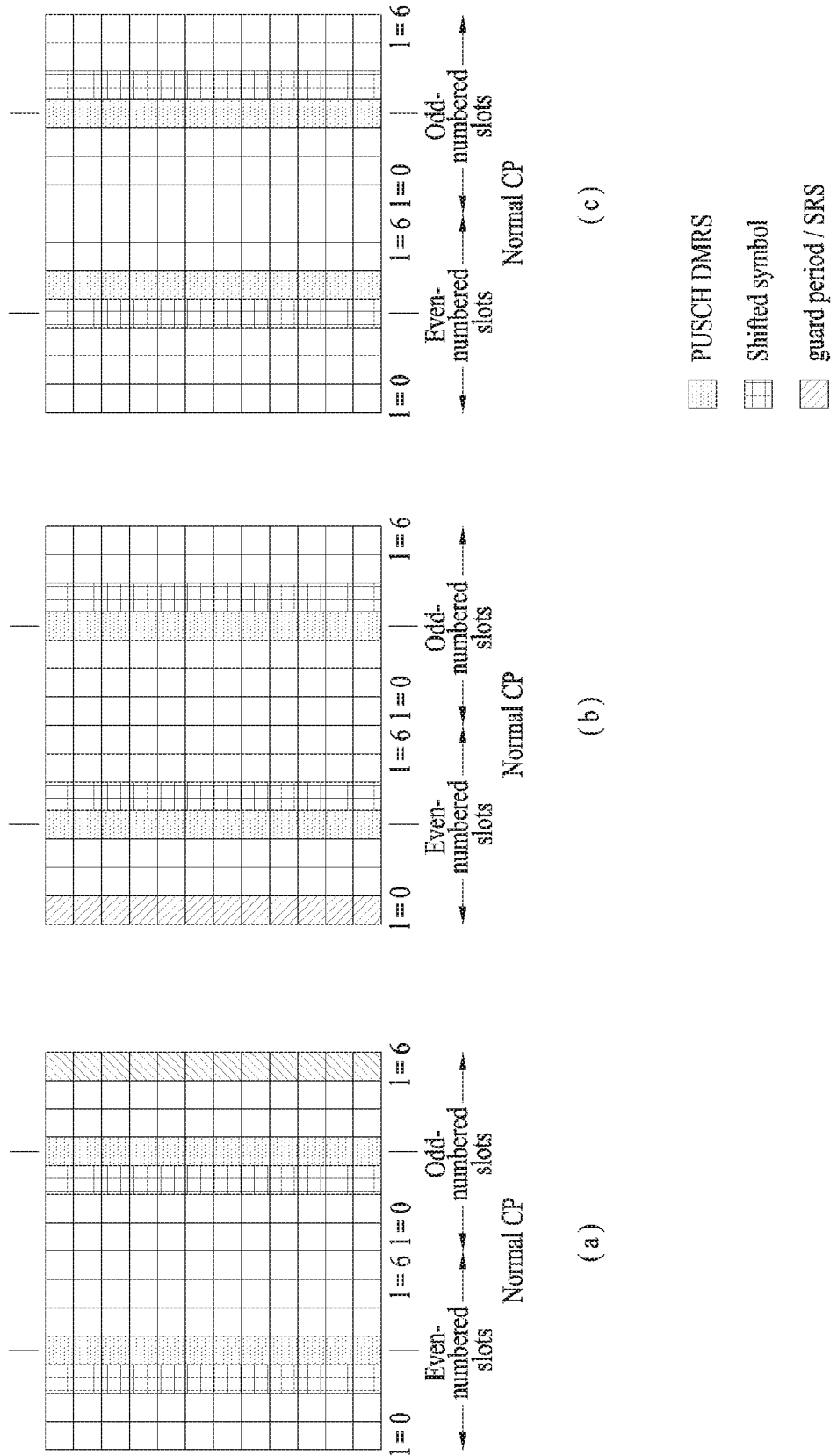

FIG. 6 illustrates the example of the D2D RS to which the symbol shift is applied as described above. FIG. 6(a) illustrates that the symbol mapped to the RS sequence is shifted from the fourth OFDM symbol of each slot by "−1 (i.e., k=−1) symbol", and FIG. 6(b) illustrates that the symbol mapped to the RS sequence is shifted from the fourth OFDM symbol of each slot by "+1 (i.e., k=+1) symbol". FIG. 6(c) illustrates that different shifts are applied according to respective slots, differently from FIGS. 6(a) and 6(b). Referring to FIGS. 6(a) and 6(b), a guard period (GP) may be established in the first or last symbol of the RB through which the D2D RS is transmitted, or the RS (e.g., SRS) may be transmitted.

Figure 9:
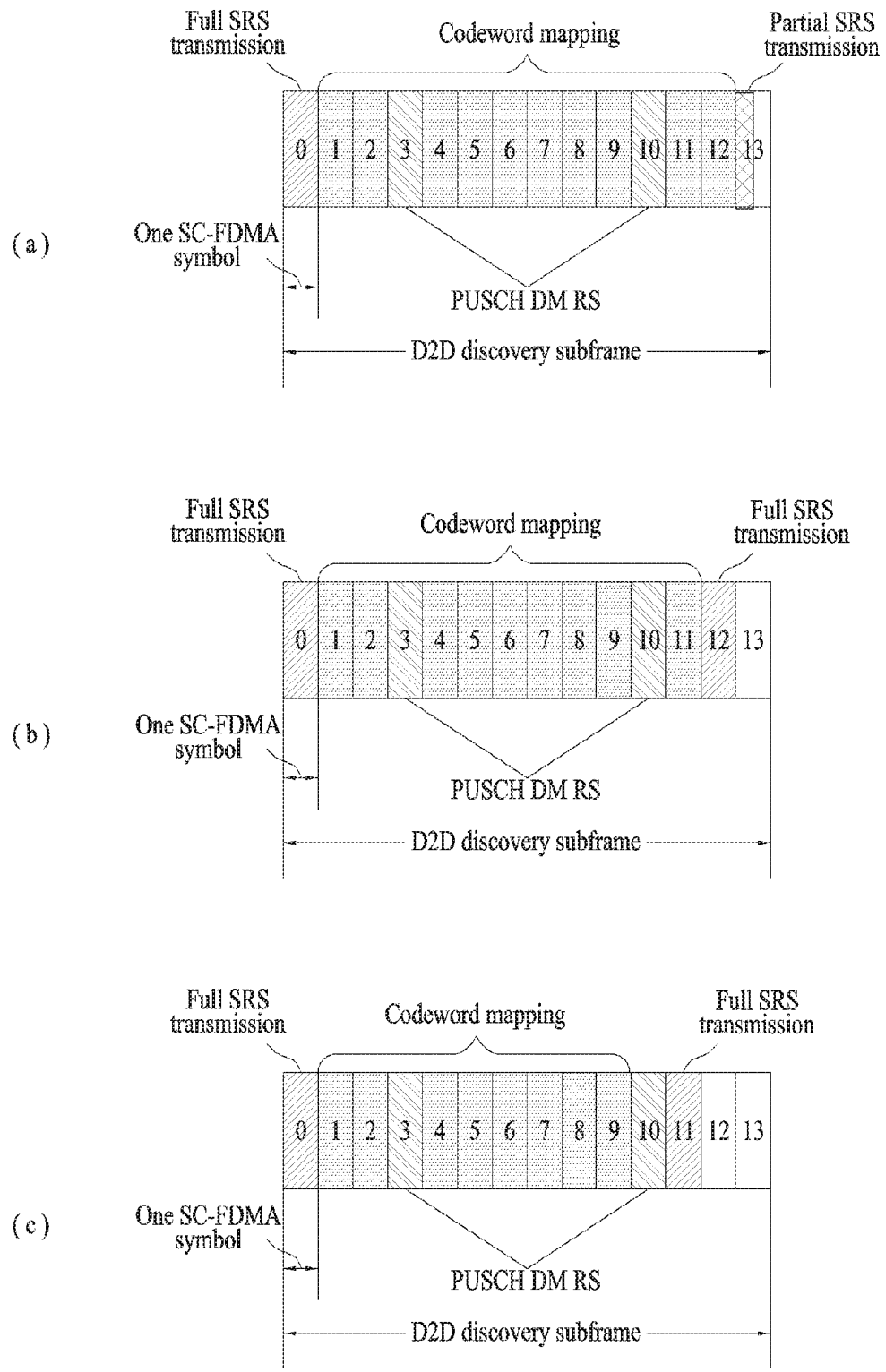
Figure 10:
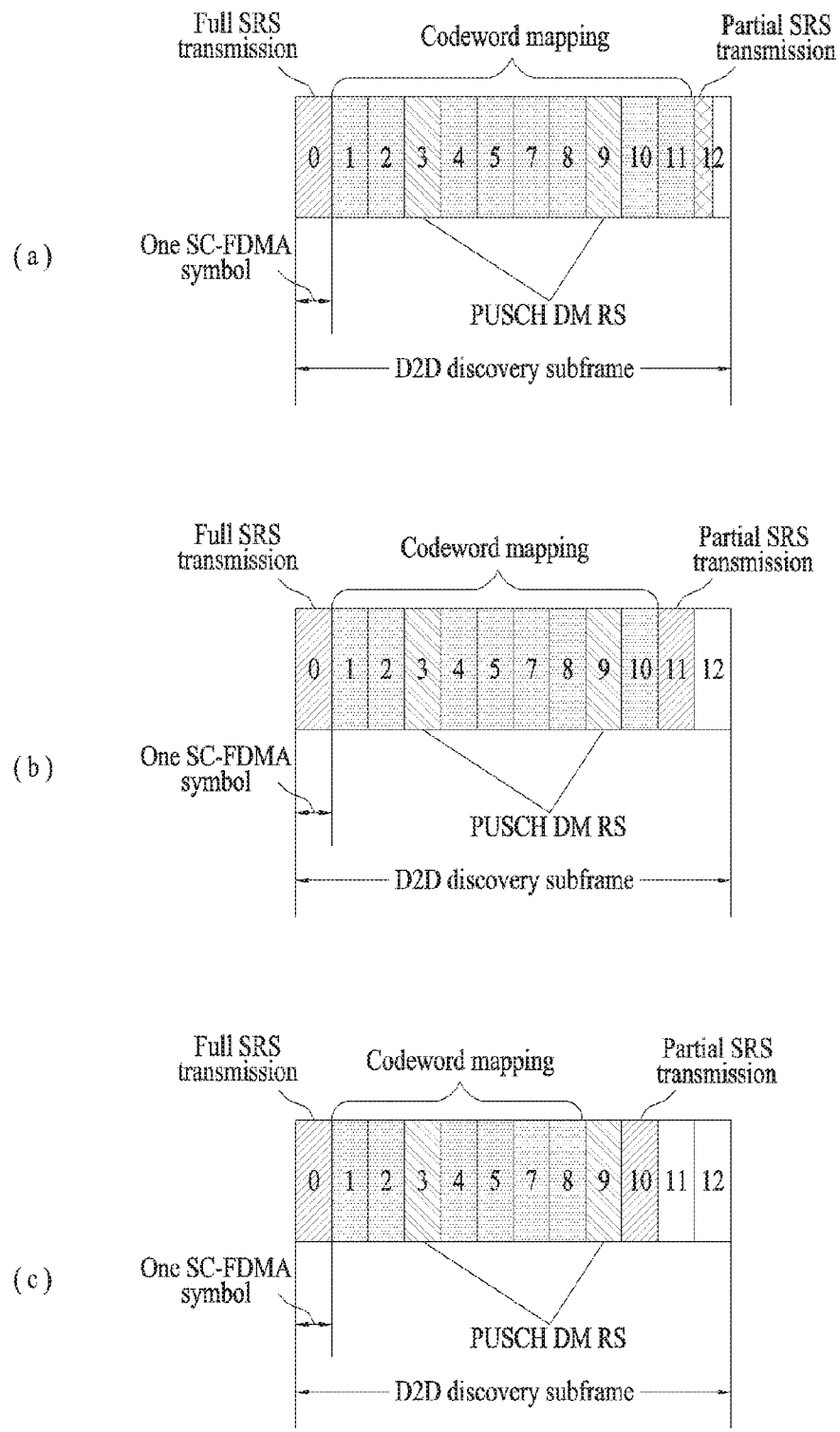

In the meantime, m (or both of n and m) may be determined according to the size of the guard period (GP), the size of the GP may be changeable according to the cell radius. FIG. 7 shows an example associated with the above case. In more detail, as can be seen from FIG. 7(a), the size of the GP is set to 0.5 symbols and 'm' is set to 0. As can be seen from FIG. 7(b), the size of the GP is set to 1 symbol and 'm' is set to −1 (i.e., m=−1). As can be seen from FIG. 7(c), the size of the GP is set to 2 symbols and 'm' is set to −2 (i.e., m=−2). That is, if the size of the GP is larger than 1 symbol as shown in FIG. 7, the absolute value of m is equal to or higher than '1'. Specifically, the number of symbols (shifted by 'm') interposed between the symbol through which the RS is transmitted and a first symbol of the guard period (GP) may be set to a constant value '2', irrespective of the size of the GP. In this case, although the position of the symbol through which RS is transmitted is shifted, the distance to a specific data symbol located farthest from the RS remains unchanged, and several data symbols interposed between RS symbols can additionally obtain a gain caused by interpolation. FIG. 8 shows the case of the extended CP, and a detailed description thereof may also be based on the concept of FIG. 7. In FIG. 9 (normal CP) and FIG. 10 (extended CP), the examples in which the size of the GP is changed are shown. Differently from FIGS. 7 and 8, FIGS. 9 and 10 illustrate that the RS symbol is not shifted even when the size of the GP is changed.

Figure 11:
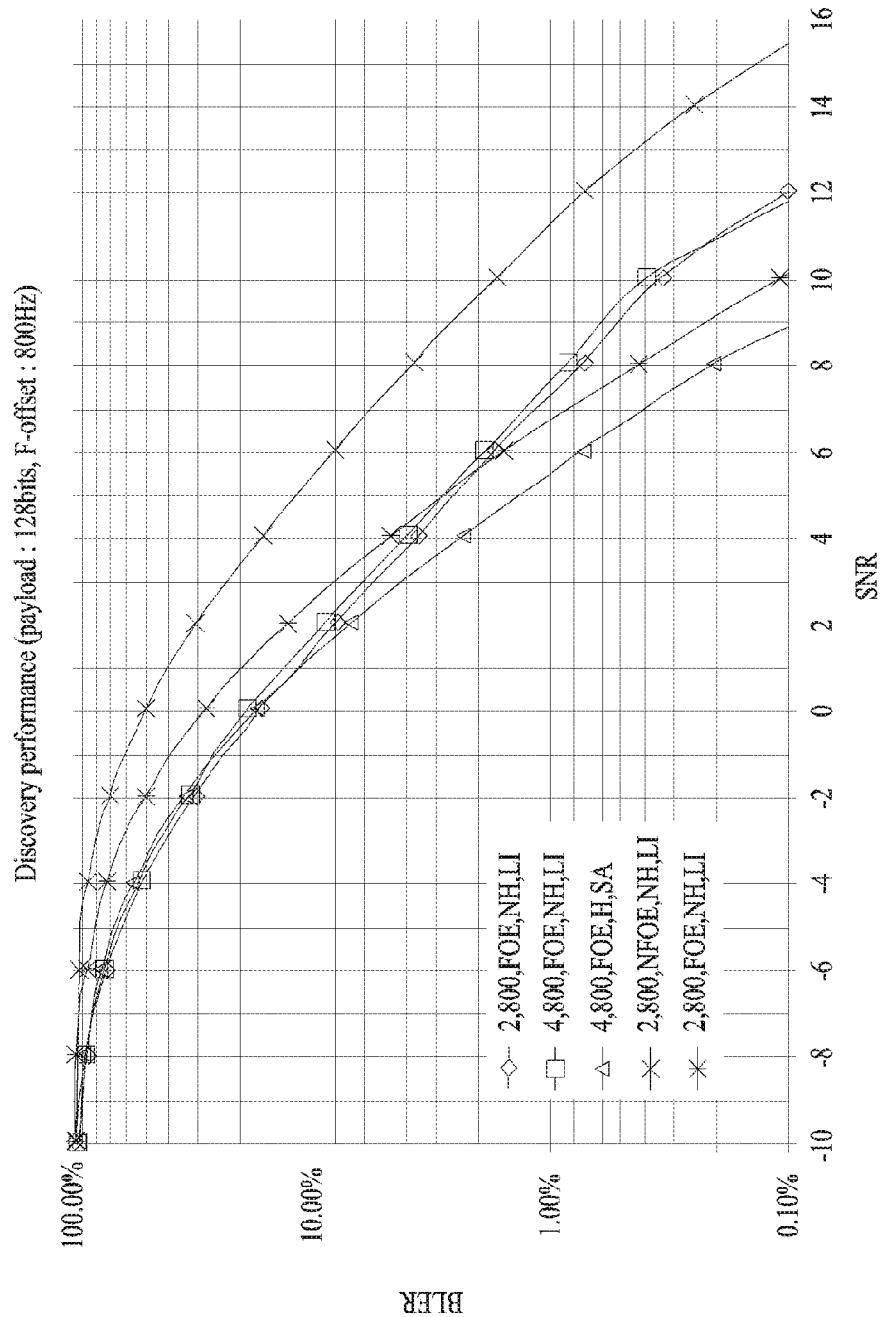

A codeword or another RS may be mapped to a boundary symbol other than the GP. For example, as shown in FIG. 7, a specific symbol located just before the GP may be another RS (e.g., a sounding reference signal (SRS)). For convenience of description and better understanding of the present invention, it is assumed that the specific symbol is identical to the SRS. The SRS may refer to an Interleaved FDMA structure in which a repetition factor is set to 2. In other words, strictly speaking, the sounding signal (SRS) may be different from the sequence. Specifically, if the size of the GP is smaller than 1 symbol as shown in FIG. 7(a), an abbreviation of the SRS may be used. The SRS may be transmitted at the first symbol when UE mobility and the frequency offset are high. For example, if the frequency offset is high, the additional RS may be used in the slot, and diversity may be obtained through slot hopping. FIG. 11 shows the result of comparison between one case in which the additional RS is transmitted and the other case in which the additional RS is not transmitted. In FIG. 11, it is assumed that the frequency offset is 800 Hz and the discovery signal composed of 128 bits is transmitted. In the indexes (e.g., 2, 800, FOE, NH, LI) shown in FIG. 11, the index of 2 may indicate that 2 DMRSs are used, the index of 4 may indicate that 2 DMRSs and 2 additional RSs are used, 'FOE' may indicate the use of the frequency offset estimation scheme, and 'NFOE' may indicate that FOE is not applied. 'SA' may indicate that channel estimation is performed through RS within the slot and a mean value of the estimation result is used as a channel estimation value of the slot. 'LI' may indicate that linear interpolation is performed using at least two RSs. 'H' may indicate that slot hopping is applied, and 'NH' may indicate that slot hopping is not applied. As shown in FIG. 11, if the frequency offset is high (e.g., 800 Hz), FOE is used and the slot hopping is also used, and at the same time the RS is added and transmitted, such that the best performance can be obtained.

In the meantime, the additional RS may be transmitted to the first symbol (and/or the last symbol) only when the slot hopping is established. Alternatively, the network and/or the specific UE may also transmit the additional RS to a first symbol (and/or the last symbol) through physical layer signaling or higher layer signaling. Alternatively, it is assumed that the additional RS exists in the slot on the condition that the slot hopping is established, and the frequency offset estimation and/or the channel estimation can be carried out.

Figure 12:
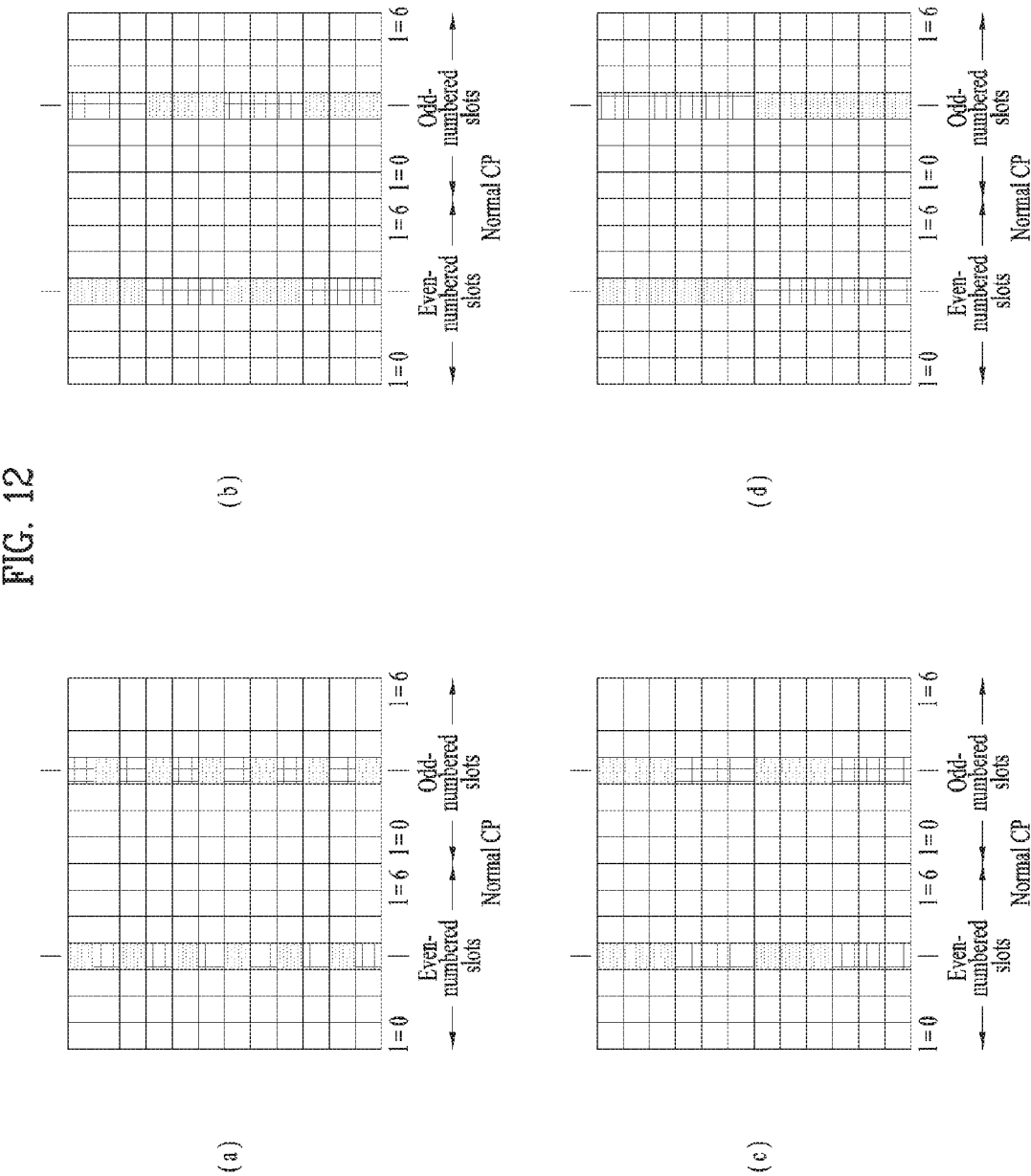

Subsequently, the number of RS candidates may be increased according to the FDM (Frequency Division Multiplexing) scheme. In this case, the number of REs used in RS transmission may be reduced, such that higher power may be allocated as compared to the RE mapped to data. In this case, the ratio of Tx power between the reference signal (RE) and data (RE) may be predetermined or may be transmitted through higher layer signaling or physical layer signaling. The associated example is shown in FIG. 12. REs denoted by different patterns in FIG. 12 may indicate different RSs. The RS sequence mapped to the RE may be defined in the legacy LTE/LTE-A system such as PUSCH DMRS or the like. RE-based FDM may be applied as shown in FIG. 12(a). In this case, the above-mentioned result may be vulnerable to the frequency offset between different offsets. If several REs are concatenated, the above-mentioned problem can be solved. FIG. 12(b) indicates that 3 REs are concatenated and FDM is applied, and FIG. 12(c) indicates that the RSs of individual slots have the same position whereas the respective slots have different FDM formats. FIG. 12(d) indicates that 6 REs are concatenated and FDM is applied.

Assuming that the number of Rx antennas of the D2D UE shown in FIG. 12 is set to 2 or higher, if the RS is effectively isolated and the channel estimation performance is guaranteed at a predetermined level or higher, data (RE) can perform detection through reception (Rx) beamforming based on the estimated channel information although the data (RE) is transmitted using the same RE within one RB. However, assuming that the number of Rx antennas of the D2D UE is set to 1, it is impossible to isolate data although the RS is isolated, and high interference occurs in the data, such that data may be isolated on the time and/or frequency axis in the same manner as in the RS. In other words, a predetermined rule in which a predetermined RE group can be decoded using only one RS may be established in advance, and this predetermined rule may be promised for the D2D Tx/Rx UE. In more detail, RE may be classified into a first RE group (A) and a second RE group (B) as shown in FIG. 13.

Embodiment 2

The second embodiment (Embodiment 2) relates to the case in which the OFDM scheme is used for D2D signal transmission. In accordance with the second embodiment, power allocated to the reference signal (RE) may be higher than that of the data (RE), and REs not overlapped with the position of UL RS defined in the legacy LTE/LTE-A system may be used. In addition, for the guard period (GP), the first symbol and/or the last symbol may be mapped to the RS. In this case, the GP may be used either for the switching between the legacy WAN communication and D2D communication or for the D2D Tx/Rx switching in the same manner as in the first embodiment (Embodiment 1).

Figures 15, 16:
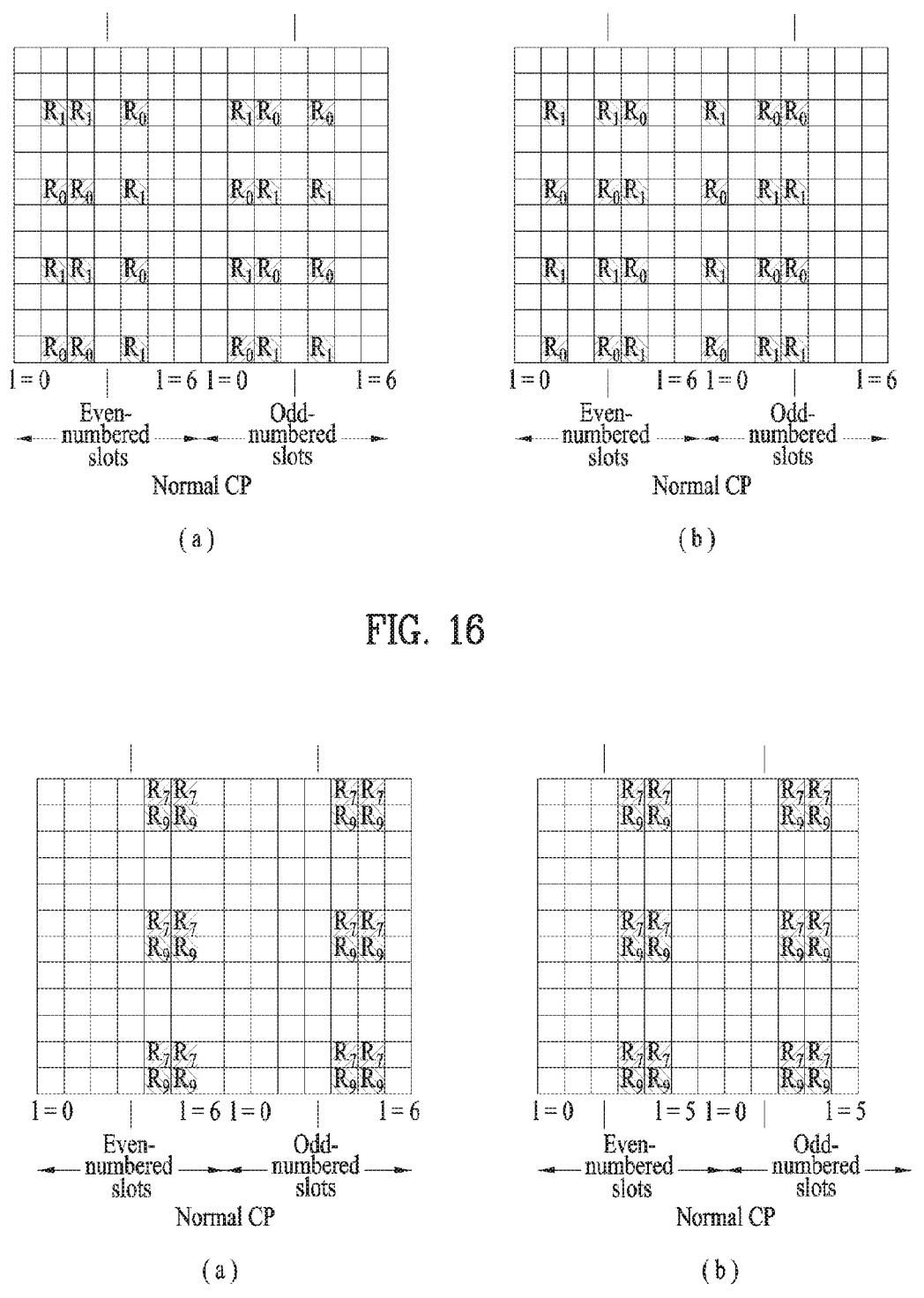

FIG. 14(a) illustrates an example of the D2D RS for use in the normal CP, and FIG. 14(b) illustrates an example of the D2D RS for use in the extended CP. In FIG. 14(a), the RS for the guard period (GP)/symbol may be mapped to the first symbol, such that the legacy CRS is shifted by one symbol. The third symbol shown in FIG. 14(b) is used for DMRS transmission, such that RSs of the second symbol of CRS shifted by one symbol are shifted to the fourth symbol because of DMRS transmission. FIG. 14 shows the RS for a maximum of 4 antennas, and actual D2D transmission may be implemented by transmission based on one or two antennas. Therefore, REs for two ports are bundled so that the resultant REs may be used for only one port. The associated example is shown in FIG. 15. If signals of different UEs are multiplexed as shown in FIG. 14, UE A may use the port #0 and the port #2, and UE B may use the port #1 and the port #3. In this case, respective ports may be used as additional separate ports and then bundled such that the bundling result may be used as one port.

FIG. 16 shows another example. DMRS defined in the legacy LTE/LTE-A system is shifted by one symbol on the time axis, such that the last symbol can be used as the guard symbol. In this structure, two ports are bundled and used as one port, resulting in improved channel estimation performance. For example, Ports #7 and #8 or Ports #9 and #10 (or Ports #7 and #9 or Ports #8 and #10) are bundled such that one new port can be constructed.

Device Configuration According to Embodiment of the Present Invention

Figure 17:
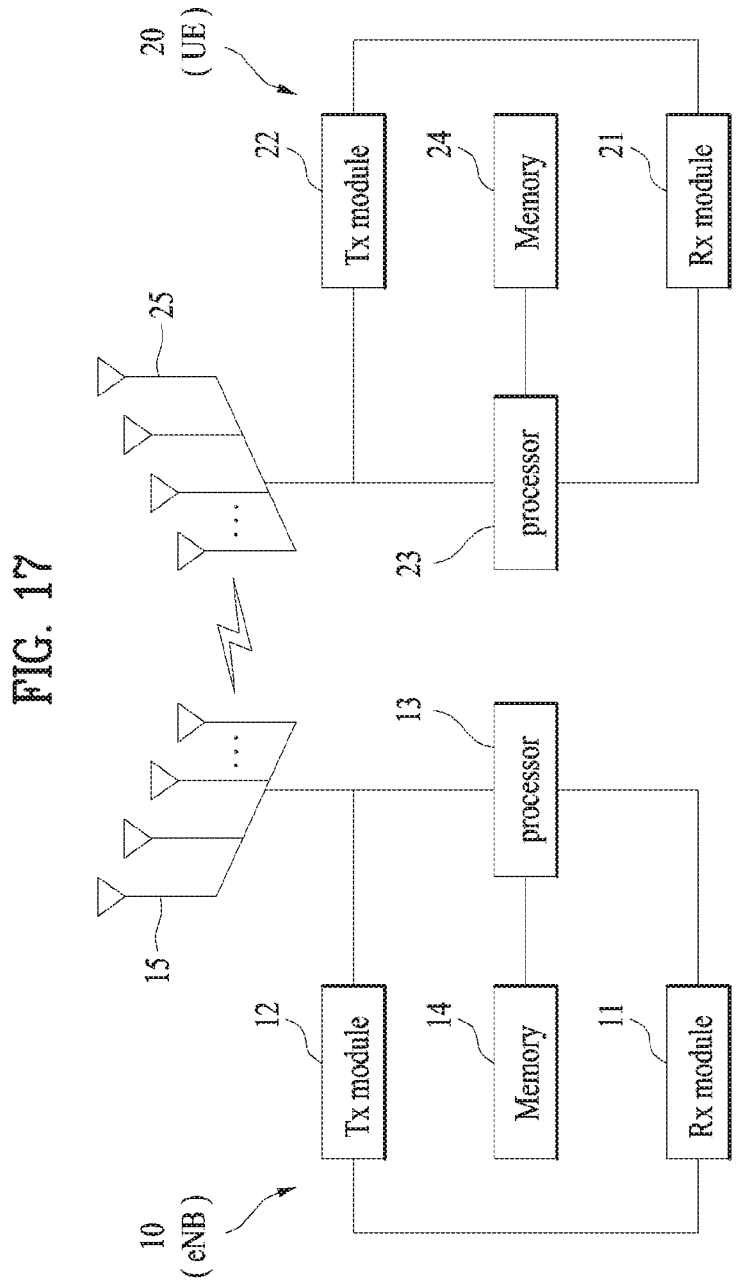
FIG. 17 is a block diagram illustrating a transceiver apparatus applicable to embodiments of the present invention.

FIG. 17 is a diagram for configuration of a transmit point apparatus and a user equipment according to embodiment of the present invention.

Referring to FIG. 17, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 17, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 17 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

What is claimed is:

1. A method for transmitting a signal by a Device-to-Device (D2D) user equipment (UE) in a wireless communication system, comprising:
   generating a reference signal (RS) sequence;
   mapping the reference signal (RS) sequence to predetermined symbols; and
   transmitting a signal comprising the reference signal (RS) sequence,
   wherein the predetermined symbols are shifted by 'n' and 'm' symbols respectively on the basis of a fourth symbol of each slot on a time axis.

2. The method according to claim 1, wherein:
   if the signal is transmitted through resource blocks (RBs) of more than 3 resource blocks (RBs), each of 'n' and 'm' is set to zero (0).

3. The method according to claim 1, wherein:
   if the signal is transmitted through resource blocks (RBs) of less than 3 resource blocks (RBs), each of 'n' and 'm' is selected in an integer set {−k, . . . , 0, . . . , k}.

4. The method according to claim 3, wherein:
   a value of 'k' is determined in consideration of at least one of a cell radius to which the D2D UE belongs, a number of UEs capable of participating in D2D communication, and a number of UEs connected to a cell.

5. The method according to claim 3, wherein:
   a value of 'k' is signaled to the user equipment (UE) via higher layer signaling.

6. The method according to claim 1, wherein:
   a value of 'm' is determined according to a size of a guard period (GP).

7. The method according to claim 6, wherein:
   if the size of the guard period (GP) is larger than 1 symbol, an absolute value of the value 'm' is equal to or higher than 1.

8. The method according to claim 7, wherein:
   a number of symbols interposed between the predetermined symbol shifted by m-symbols and a first symbol of the guard period (GP) is a constant value, irrespective of the size of the guard period (GP).

9. The method according to claim 7, wherein:
   a sounding reference signal (SRS) is transmitted to a symbol located just before the guard period (GP).

10. The method according to claim 9, wherein:
    if the size of the guard period (GP) is smaller than 1 symbol, an abbreviation format of the sounding reference signal (SRS) is used.

11. The method according to claim 1, wherein:
    if UE mobility is higher than a predetermined value, a sounding reference signal (SRS) is transmitted on a first symbol of a resource block including the predetermined symbols.

12. The method according to claim 1, wherein:
    if slot hopping is configured for the user equipment (UE), the user equipment (UE) assumes that a sounding reference signal (SRS) is transmitted in at least one symbol contained in the resource block (RB) including the predetermined symbols.

13. A Device-to-Device (D2D) user equipment (UE) for use in a wireless communication system, comprising:
    a reception (Rx) module; and
    a processor,
    wherein the processor generates a reference signal (RS) sequence, maps the reference signal (RS) sequence to predetermined symbols, and transmits a signal comprising the reference signal (RS) sequence,
    wherein the predetermined symbols are shifted by 'n' and 'm' symbols respectively on the basis of a fourth symbol of each slot on a time axis.

* * * * *